United States Patent [19]

Fails

[11] 4,045,040
[45] Aug. 30, 1977

[54] DEER STAND AND GAME CARRIER

[76] Inventor: Hershell W. Fails, 134 Scout Road, Freeport, Tex. 77541

[21] Appl. No.: 648,826

[22] Filed: Jan. 13, 1976

[51] Int. Cl.² .......................................... B62D 51/04
[52] U.S. Cl. .......................................... 280/1.5; 43/1; 182/20; 224/8 A; 224/9; 297/118; 280/652
[58] Field of Search ............... 224/25 A, 8 A, 9; 43/1; 280/1.5, 47.18, 30, 47.27; 297/4, 118, 130, 217; 182/20, 21

[56] References Cited

U.S. PATENT DOCUMENTS

| | | | |
|---|---|---|---|
| 1,416,018 | 5/1922 | Hall | 297/130 X |
| 2,820,643 | 1/1958 | Cohn | 280/47.27 X |
| 3,282,375 | 11/1966 | Ray | 182/20 X |
| 3,954,155 | 5/1976 | Guidara | 182/20 |

FOREIGN PATENT DOCUMENTS

| | | | |
|---|---|---|---|
| 1,288,251 | 9/1972 | United Kingdom | 182/20 |
| 6,522 | 3/1896 | United Kingdom | 280/30 |

Primary Examiner—Robert J. Spar
Assistant Examiner—Donald W. Underwood
Attorney, Agent, or Firm—Ranseler O. Wyatt

[57] ABSTRACT

A deer stand and game carrier having a framework, a back pack connection at one end of said framework, and a pair of wheels mounted on the other end, and a ladder mounted on the framework between said back pack and wheels, which, when the desired location is reached, may be pivotally mounted on the framework and moved into stand position, with the backpack portion being utilized as a stand seat. The framework is composed of telescoping members to permit the legs to be extended as desired.

3 Claims, 4 Drawing Figures

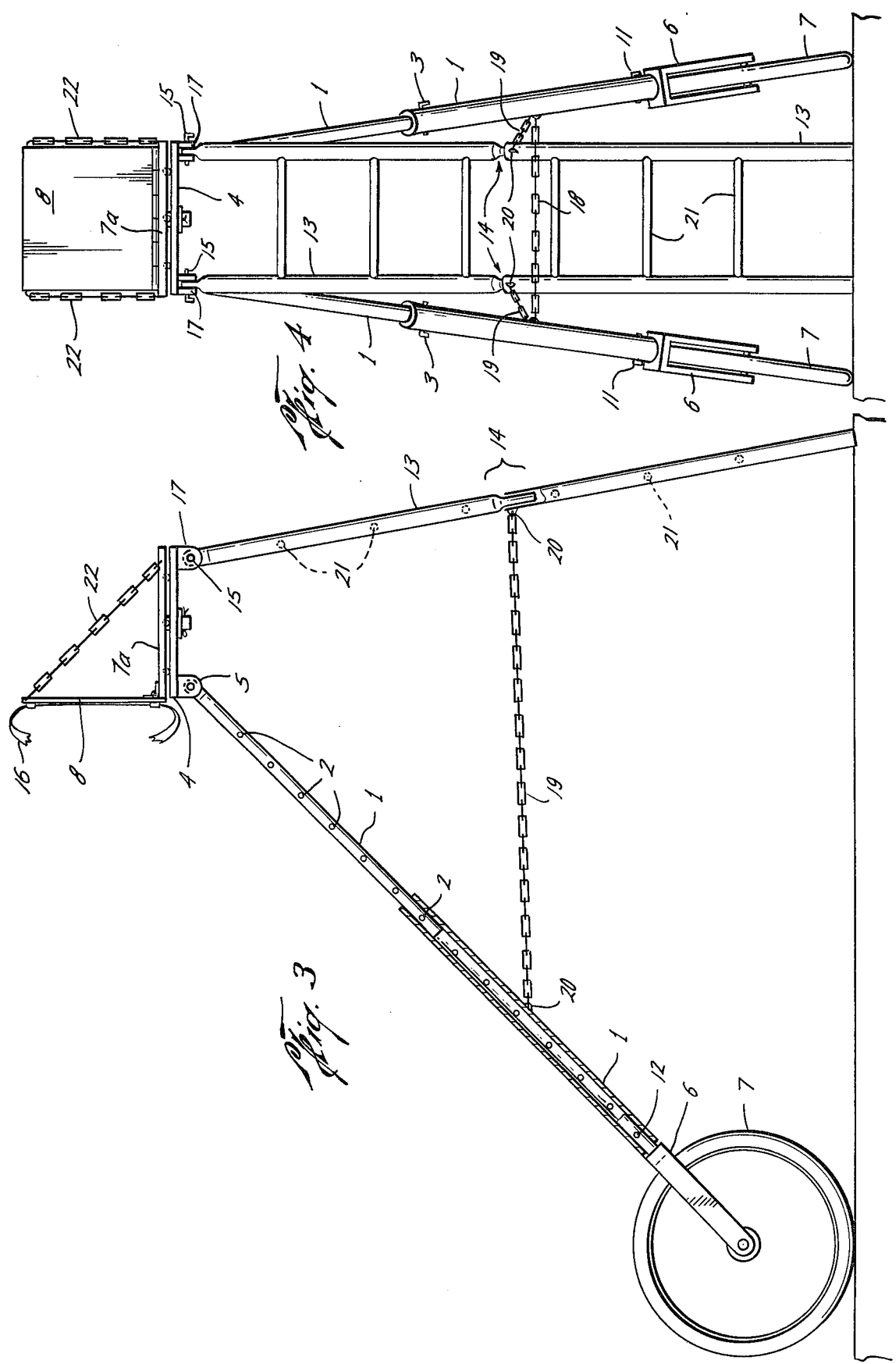

DEER STAND AND GAME CARRIER

SUMMARY OF THE INVENTION

A deer stand and game carrier having telescoping framework members and a back pack to which one end of the framework is pivotally mounted and a ladder mountable on said framework, resting on and carried by said frame when in one position and pivoting to the back pack when in another position.

BRIEF DESCRIPTION OF THE DRAWINGS

FIG. 3 is a side elevational view of the device in another position, and

FIG. 4 is a front elevational view of the device in said position.

BRIEF DESCRIPTION OF THE PREFERRED EMBODIMENTS

Figure 1:
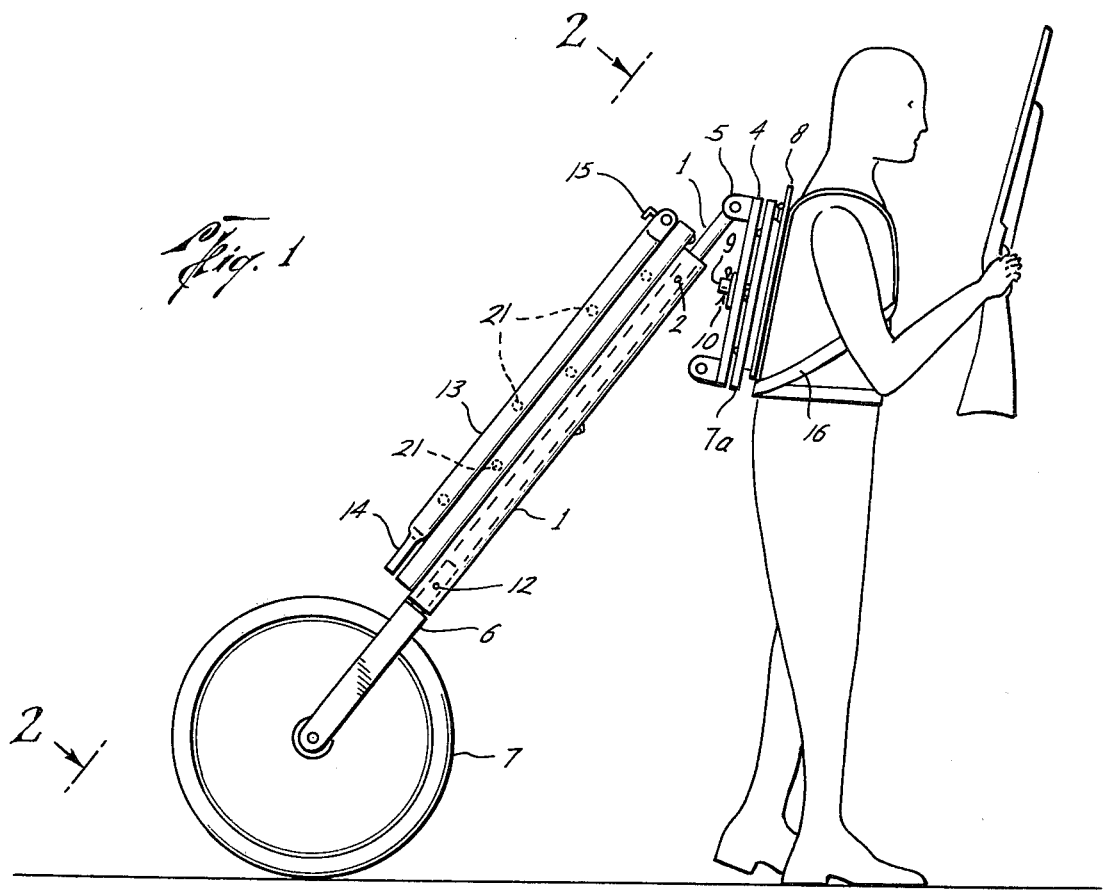
FIG. 1 is a side elevational view of the device shown with one end attached to the backpack of a hunter.
Figure 2:
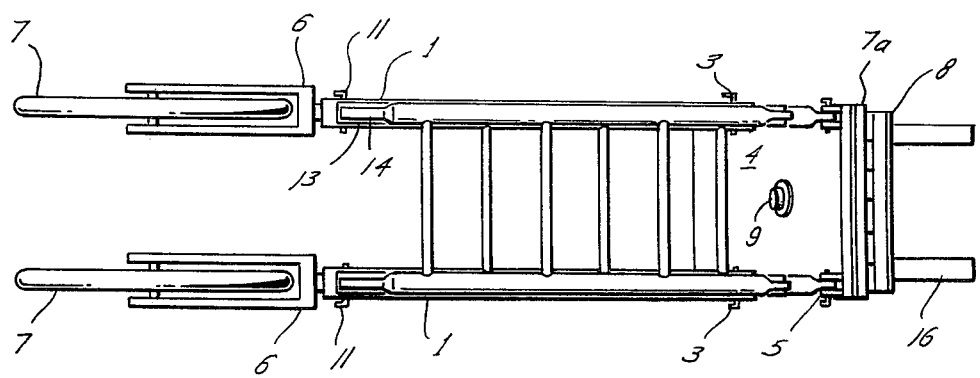
FIG. 2 is a top plan view of the device in one position.

In the drawings, the numerals 1, I designate a framework of rigid material, such as telescoping tubular members, in which orifices 2, 2 are formed to receive the pins 3, 3 to lock the members in the desired position. On one end of the frame tubular members 1, 1 is formed an orifice to receive a pin, so that the frame 1 may be pivotally mounted on the flat seat member 4 by means of the outwardly extending legs 5, 5. Extended into the opposite ends of the tubular members 1, 1 are the wheel mounts 6, 6, which support the wheels 7, 7. A swivel seat 7a having a hinged back 8, has the axial stud 9 extending the refrom and which extends through the seat 4, and an axial orifice through the seat 4 being provided to receive said stud. A cotter key 10 secures the seat and the supports 6 are pinned to the frame 1 by means of the pins 11, extending through the orifices as 12.

A ladder frame 13, having telescoping terminals as 14, 14, are mounted on top of and in parallel relation with the framework 1, and orifices through both frameworks, in aligment, receive the pin 15 to maintain the ladder in position on the frame. Back straps, 16, attached to the seat back 8, fit over the body of the user, to support one end of the device while in transport.

When it is desired to convert the carrier to a stand, the pins 15 are removed and the ladder frame 13 is removed and the upper ends of one of the telescoping members of the said frame having the orifices to receive the pin 15, are fitted into the legs 17 on the member 4 and the pins 15 mounted therein and the telescoping ends of the frame 13 are fitted together and pinned in place by pins. The connection with the legs 17 is loose enough to permit a slight spreading of the members 1, and the spread is limited by means of the chain 18, and the spread between the two frames is limited by the chains 19, 19. Outwardly extending loops 20, 20 mounted on the respective frames, receive the ends of the respective chains. The frames 1, 1 are extended by removing the pins 3, 3 and reinstalling them within the tubular members realigned orifices in the desired position.

With the two frames pivotally attached to the seat, and the free ends of the frames spread apart, the device becomes a stand, and the hunter will position it where desired, climb the ladder and be seated in the seat 4, where chains, as 22, will limit the movement of the seat back. In the event of a successful hunt, the hunter may return the stand to its first described position, with the ladder mounted on the frame 1, and the game may be placed on the ladder and secured thereon by the chains, and the back straps employed to support one end of the frame and the game readily transported. When the device is no longer needed, it may be completely disassembled and packed in a flat package readily received in the trunk of an automobile.

What I claim is:

1. In a collapsible deer stand, a telescoping framework comprised of a first telescoping frame and a second telescoping frame, said second frame forming a ladder, means for selectively and detachably anchoring the second frame on said first frame in a collapsed position, wheels on one end of said first frame and a seat assembly pivotally mounted on the other end of said first frame, shoulder straps attached to said seat assembly, said straps and said seat assembly comprising a backpack for towing said stand when collapsed, means on said seat for selectively receiving said second frame and pivotally suspending said second frame therefrom when said stand is in a noncollapsed position.

2. The device defined in claim 1 wherein the first frame has at least two leg means and means are provided to limit the spread of the legs means and means are provided to limit the spread of the first and second frames from each other.

3. The device defined in claim 1 wherein a plurality of orifices are formed in the first frame to provide means for selective positioning of the telescoping parts.

* * * * *